Figure 1:
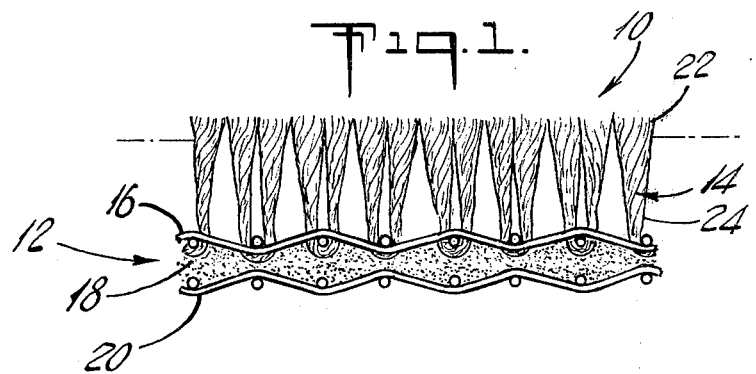
Figure 2:
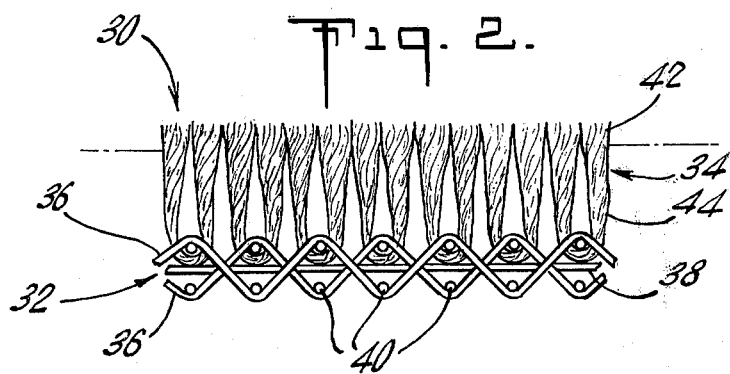
Figure 3:
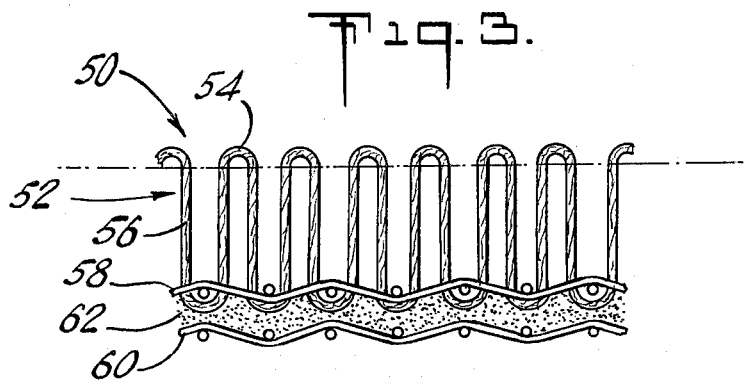

United States Patent [19]

Psaar

[11] 3,999,939
[45] Dec. 28, 1976

[54] TRANSFER PRINTING PROCESS
[75] Inventor: Hubertus Psaar, Leverkusen, Germany
[73] Assignee: Bayer Aktiengesellschaft, Leverkusen, Germany
[22] Filed: May 10, 1974
[21] Appl. No.: 468,687
[30] Foreign Application Priority Data
May 10, 1973 Germany .......................... 2323538
May 22, 1973 Germany .......................... 2325928
[52] U.S. Cl. ................. 8/2.5 A; 8/162 R; 8/168 C; 8/62
[51] Int. Cl.² ............................... D06P 5/20
[58] Field of Search ........................... 8/2.5, 168 C
[56] References Cited
UNITED STATES PATENTS

| | | | |
|---|---|---|---|
| 2,755,200 | 7/1956 | Balon et al. | 117/36 |
| 2,893,816 | 7/1959 | Tsang et al. | 8/55 |
| 2,911,280 | 11/1959 | Cicogna | 8/2.5 |
| 3,048,565 | 8/1962 | Gall et al. | 260/75 |
| 3,347,865 | 10/1967 | Brack | 260/313.1 |
| 3,642,823 | 2/1972 | Raue et al. | 260/326.15 |

FOREIGN PATENTS OR APPLICATIONS

| | | |
|---|---|---|
| 2,101,910 | 7/1971 | Germany |
| 7,009,621 | 4/1970 | Japan |
| 6,917,952 | 6/1970 | Netherlands |
| 1,342,304 | 1/1974 | United Kingdom |
| 1,211,149 | 11/1970 | United Kingdom |
| 951,987 | 3/1964 | United Kingdom ............ 8/2.5 UX |
| 1,211,149 | 11/1970 | United Kingdom ............ 8/2.5 UX |

OTHER PUBLICATIONS

Moore, J., Soc. Dyers and Colourists, 1974 (Sept.), pp. 318–325.
Proc. American Assoc. Textile Chemists and Colourists, Jan., p. 26.

Primary Examiner—Joseph L. Schofer
Assistant Examiner—A. L. Clingman
Attorney, Agent, or Firm—Plumley and Tyner

[57] ABSTRACT

The subject of the invention is a process for printing acid-modified textile fibre materials by the transfer printing process, which is characterized in that sublimable carbinol base derivatives of cationic dyestuffs of the formula

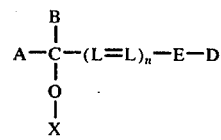

wherein A, B, D, E, X, L and $n$ have the meaning given in the description are used.

7 Claims, No Drawings

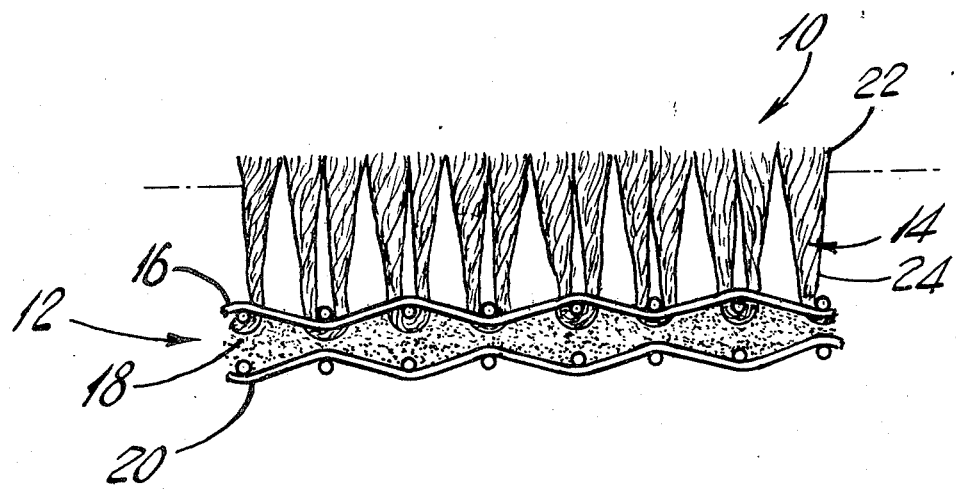

TRANSFER PRINTING PROCESS

The subject of the invention is a process for printing acid-modified textile fibre materials by the transfer printing process, which is characterised in that sublimable carbinol base derivatives of cationic dyestuffs of the formula

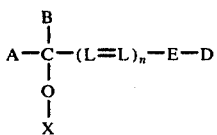

wherein

A, B and D represent an aryl or heteryl radical,
B additionally denotes hydrogen or conjointly with A can form the remaining members of a deterocyclic ring system,
E represents a direct bond or a $>$N-alkyl group,
X denotes alkyl, aralkyl, cycloalkyl or aryl,
L represents a methine group which is optionally substituted by alkyl, nitrile or alkoxycarbonyl, or represents a N atom, and
$n$ denotes the numbers 0 or 1, are used as dyestuff intermediates.

Suitable aryl radicals A, B and D are naphthyl radicals and preferably phenyl radicals, of which at least one carries an amino, alkylamino, dialkylamino, arylamino, arylalkylamino, alkoxy or aralkoxy substituent in the 4-position relative to the central C atom. In addition, these radicals can contain further non-ionic substituents customary in dyestuff chemistry, such as nitro, halogen, alkyl, cycloalkyl, hydroxyl, alkoxy, aralkoxy, cycloalkoxy, aryloxy, acyloxy, acyl, alkoxycarbonyl, amidocarbonyl, nitrile, amino, alkylamino, dialkylamino, acylamino, mercapto, alkylmercapto and arylmercapto groups; "acyl" is in general to be understood as alkylcarbonyl or arylcarbonyl.

Suitable heteryl radicals A, B and D are radicals of the following heterocyclic structures: indole, indoline, thiazole, benzthiazole, imidazole, benzimidazole, 1,2,4-triazole, indazole, pyrazole, pyridine, quinoline, pyrimidine, quinoxaline, pyrane, benzo(b)-pyrane and benz(cd)-indole.

These radicals can also be substituted further in the usual manner by non-ionic substituents such as, for example, alkyl, cycloalkyl, aryl, halogen and alkoxy.

Suitable heterocyclic structures which A and B can form conjointly with the central C atom in compounds of the formula I are:

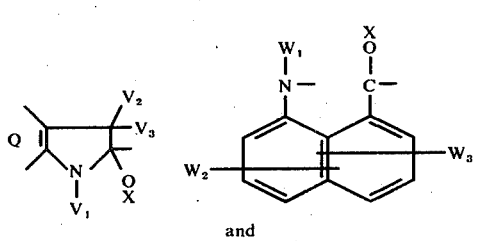

and

-continued

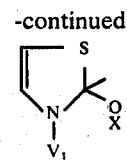

wherein

X has the abovementioned meaning and
Q is a fused arylene radical and
$V_1$, $V_2$, $V_3$, $W_1$, $W_2$ and $W_3$ are substituents customary for these types of dyestuffs, such as, for example,
H, alkyl, halogen and others.

Since the group —OX is split off under the transfer printing conditions, with formation of the corresponding dyestuff cation, that is to say are lost as far as the dyestuff formation is concerned, the radical X should, of course, only be a "simple" radical entailing little cost, such as methyl, ethyl, propyl, butyl, benzyl, phenylethyl, cyclohexyl, phenyl, tolyl and the like.

By the alkyl radicals mentioned above in any context (except in the definition of X), there are to be understood saturated and unsaturated alkyl radicals which preferably possess 1–4 C atoms and which can optionally be substituted, preferably monosubstituted, by halogen, OH, CN, alkoxy, phenyl and the like. As examples there may be mentioned: methyl, ethyl, propyl, butyl, vinyl, allyl and cyanoethyl.

By the aryl radicals mentioned above in any desired context there are to be understood, unless defined otherwise, above all phenyl radicals which can preferably be monosubstituted, disubstituted or trisubstituted by halogen, $C_1$–$C_4$-alkyl or $C_1$–$C_4$-alkoxy.

The abovementioned cycloalkyl radicals are preferably cyclopentyl and cyclohexyl radicals which can be substituted, for example by halogen or $C_1$–$C_4$-alkyl.

The alkoxy radicals mentioned above in any desired context preferably have 1–4 C atoms.

The dyestuff intermediates to be used according to the invention are known or are easily obtainable according to known processes, for example by etherifying the corresponding free carbinol bases (that is to say compounds of the formula I wherein X = H) in a known manner (compare, for example, Berichte 33, 3357; Zeitschrift für Farben und Textilchemie 1, 2) or reacting the corresponding dyestuff salts with alcohols (compare, for example, Berichte 37, 2867 and J. pr. Chem. (2) 118, 118).

The carbinol bases themselves are either synthesised directly (compare, for example, A 354,201) or are liberated from the corresponding dyestuff salts.

The dyestuff salts, in turn, are all known. Suitable dyestuff salts for preparing the compounds to be used according to the invention are
1. diarylmethane and triarylmethane dyestuffs, such as are described in Colour Index (for example C.I. Basic Blue 1, C.I. Basic Blue 5 and C.I. Basic Green 4) or in the more recent patent literature (for example German Offenlegungsschriften (German Published Specifications) No. 1,811,337, 1,811,338, 1,811,651, and 1,811,652).
2. Indolylarylmethane dyestuffs, such as are described, for example, in German Offenlegungsschrift (German Published Specification) No. 1,569,742.

3. Cyanine dyestuffs, such as are described, say, in the Colour Index, for example C.I. Basic Violet 16 and C.I. Basic Orange 22.

4. Azacyanine dyestuffs, such as descirbed, say, in German Patent Specification Nos. 1,083,000, 1,150,475 and 1,150,476 as well as 1,163,775.

5. Cyanine dyestuffs which are derived from naphtholactam derivatives, such as, for example, those of German Patent Specification Nos. 1,170,569, 1,184,882, 1,190,126, 1,190,126 b and 1,287,004.

6. Benzo-(b)-pyrane dyestuffs, such as are described, say, in Helv. 34, 1772 (1951) and Teintex No. 8-9, 459 (1972).

Particularly suitable dyestuff intermediates are those of the formulae

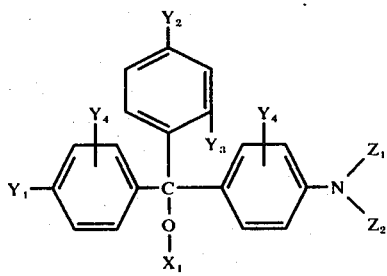

a)

wherein $Z_1$ and $Z_2$ denote H or $C_1$–$C_4$-alkyl, $Y_1$ denotes amino, $C_1$–$C_4$-alkylamino, $C_2$–$C_4$-dialkylamino or $C_1$–$C_4$-alkoxy, $Y_2$ denotes $Y_1$ or H, $Y_3$ and $Y_4$ denote H, methyl or chlorine and $X_1$ denotes $C_1$–$C_4$-alkyl, benzyl or phenyl.

(Those with $Y_1 = OCH_3$, $Y_4 = H$ and $Y_3 = Cl$ or $CH_3$ are very particularly preferred).

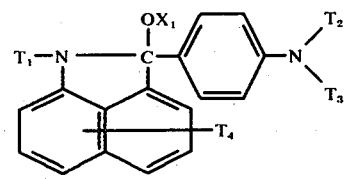

b)

wherein $T_1$ denotes methyl, ethyl, n-propyl, n-butyl or cyanoethyl, $T_2$ denotes methyl or ethyl, $T_3$ denotes $T_2$ or H and $T_4$ denotes H, Br or Cl and $X_1$ has the indicated meaning.

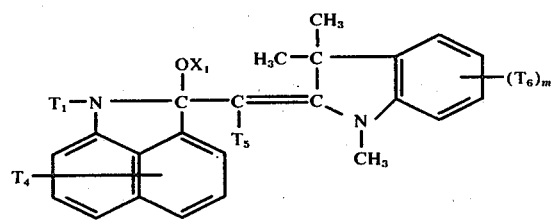

c)

wherein $T_1$, $T_4$ and $X_1$ have the indicated meaning and $T_5$ denotes H or CN, $T_6$ denotes H, $CH_3$, $OCH_3$, $NO_2$, Cl, $COOCH_3$ or $COOC_2H_5$ and m denotes 1 or 2.

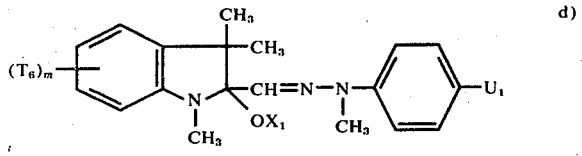

d)

wherein $X_1$, $T_6$ and m have the meaning mentioned and $U_1$ represents hydrogen, $C_1$–$C_4$-alkyl, $C_1$–$C_4$-alkoxy or $C_2$–$C_5$-alkylcarbonylamino.

The transfer printing process used according to the invention is generally known and is described, for example, in French Patent Specification Nos. 1,223,330 and 1,334,829.

It is characterised in that the dyestuffs are transferred by the action of heat and optionally of pressure from an auxiliary carrier, printed with special printing inks, onto the substrate which is to be printed, that is to say are in general transferred by sublimation. Hitherto, as a rule, readily sublimable disperse dyestuffs have been employed for this purpose, and polyester fibre materials have preferably been employed as substrates.

The dyestuffs to be used according to the invention, on the other hand, are preferentially suitable for printing of textile fibre materials which can be dyed with basic dyestuffs.

As in the customary transfer process, the auxiliary carriers used are preferably paper, but also cellophane, cellulose textiles, metal foils and the like.

The dyestuffs are in general not applied as such to the auxiliary carriers, but instead are applied in a manner which is in itself known by means of printing pastes, spraying solutions, dyeing liquors and, preferably, anhydrous printing inks which have a neutral reaction.

These printing inks are characterised in that they contain at least a. a dyestuff of the formula I which can be sublimed at 160° to 240°, b. an organic solvent customary for printing inks, and c. a resin soluble in the solvent.

The dyestuff is generally present in these printing inks in the form of a solution.

Suitable solvents are: hydrocarbons such as benzene, toluene or xylene; chlorinated hydrocarbons such as chlorobenzene, ethylene chloride, trichloroethylene and tetrachloroethylene; alcohols such as methanol, ethanol, isopropanol, butanol and benzyl alcohol, ketones such as methyl ethyl ketone and cyclohexanone, and various ethers and esters. The solvents are used in the pure form or as mixtures.

As resins it is possible to employ, in principle, the same types as are used in the preparation of transfer printing inks based on disperse dyestuffs, provided the resins have a neutral reaction because of the sensitivity to acid and alkali of the dyestuffs to be used according to the invention.

Examples of suitable resins are ketone resins, such as, say, Kunstharz AFS$^{(R)}$, and cellulose ethers, such as, say, ethylcellulose.

To improve the contour sharpness of the prints produced according to the invention it is possible, if desired, to coat the auxiliary carriers, printed with the new printing inks, with a colourless layer of binder or resin, in accordance with the instructions of German Offenlegungsschrift (German Published Specification) No. 2,101,910.

Suitable substrates which take up the dyestuff during the transfer printing process are - as already mentioned - usual materials which can be dyed with basic dyestuffs, for example materials of polyacrylonitrile, of copolymers of acrylonitrile with other vinyl compounds, such as vinyl chloride, vinylidene chloride, vinyl fluoride, vinyl acetate, vinylpyridine, vinylimidazole, vinyl alcohol, acrylic and methacrylic acid esters and amides and asymmetrical dicyanoethylene, and of acid-modified synthetic materials, especially of acid-modified aromatic polyesters and acid-modified polyamide fibres. Acid-modified aromatic polyesters are, for example, polycondensation products of sulphoterephthalic acid and ethylene glycol, that is to say polyethylene glycol terephthalates containing sulphonic acid groups (type DACRON 64 of E. I. DuPont de Nemours and Company), as are described in Belgian Pat. Specification No. 549,179 and U.S. Pat. No. 2,893,816.

The dyestuff transfer takes place at temperatures of 160° to 240° C, preferably 200° to 220° C, over the course of 15 to 60 seconds.

The heat transfer can be effected by direct contact with heating plates, or by hot air, hot steam or infrared radiation. Dyeings and prints which display good fastness properties in use are obtained on the materials used as substrates.

EXAMPLE 1

20 g of the carbinol base derivative of the formula

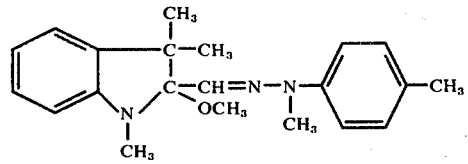

are ground with 0-7.5 g. of a cyclohexanone-formaldehyde resin of softening point above 160° C and 10-2.5 g. of ethylcellulose N₄ in a pearl mill. 100 parts of a printing ink are produced by addition of toluene containing 10% of polywaxes. A paper is impregnated with this printing ink, using a spray gun. If this paper is pressed for 15-30 seconds at 180° C against a textile of polyacrylonitrile fibres, a yellow print with good fastness properties is obtained. If a textile of acid-modified polyester fibres (Dacron 64) is used, a strong yellow dyeing is again obtained.

EXAMPLE 2

20 g of the carbinol base derivative of the formula

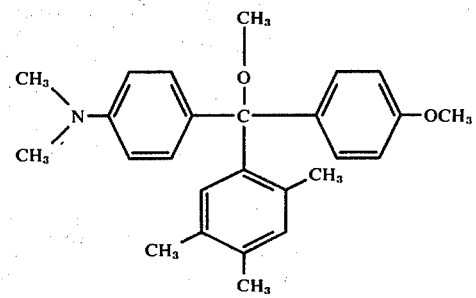

are dissolved in 800 g of toluene containing 10% of polywaxes. A paper is impregnated with this solution and dried. If this paper is pressed against a fabric of polyacrylonitrile fibres at 180° C, a red dyeing with good fastness properties is obtained.

EXAMPLE 3

20 g of the carbinol base derivative of the formula

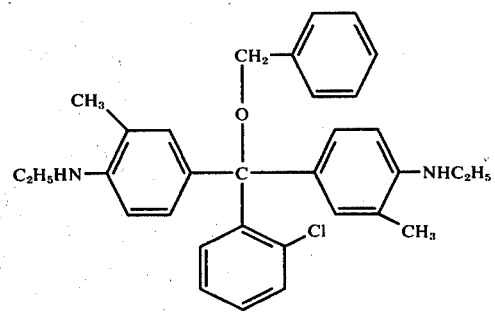

are converted to a printing ink as in Example 2. An aluminium foil is impregnated with this printing ink by means of a spray gun. If this foil is pressed against a fabric of polyacrylonitrile fibres for 15-40 seconds at 180° C, a clear blue print is obtained. If a textile of acid-modified polyamide is used, a blue print is again obtained.

If instead of the dyestuff intermediates employed in Examples 1-3 the carbinol base derivatives indicated by formulae in the table which follows are used, and one of the abovementioned processes is employed, transfer materials and transfer prints with the colour shades indicated in the last column are obtained.

| Example | Formula | Colour shade |
|---|---|---|
| 4 | | green |

-continued
| Example | Formula | Colour shade |
|---|---|---|
| 5 | 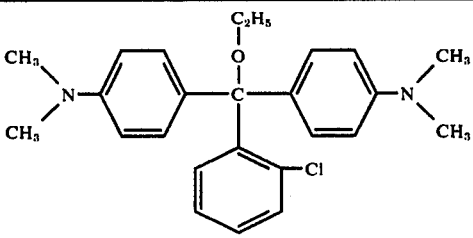 | blue |
| 6 | 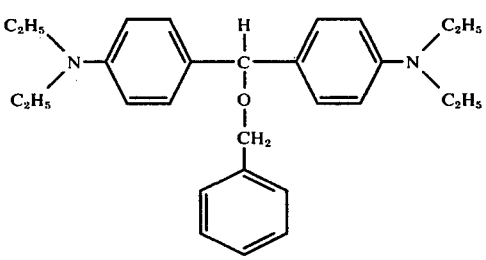 | blue |
| 7 | 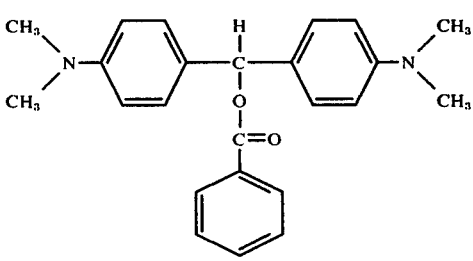 | blue |
| 8 | 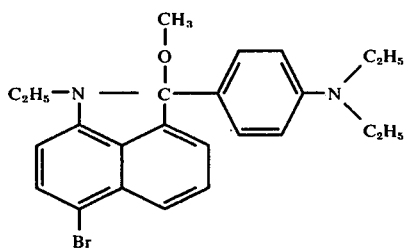 | reddish-tinged blue |
| 9 | 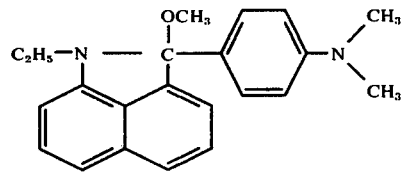 | reddish-tinged blue |
| 10 | 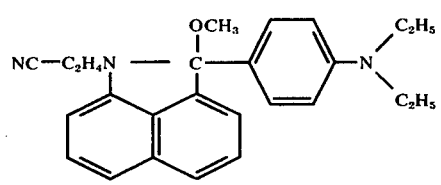 | reddish-tinged blue |
| 11 | 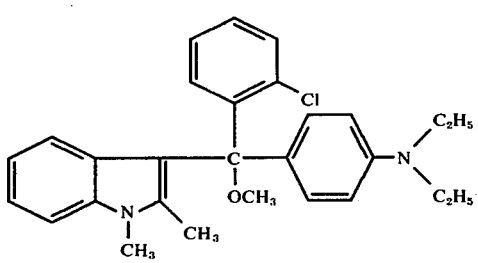 | blue |

-continued

| Example | Formula | Colour shade |
|---------|---------|--------------|
| 12 | (structure: 1-methyl-2-phenylindole linked via C(OCH₃) to 2-chlorophenyl and 4-(N,N-diethylamino)phenyl) | blue |
| 13 | (structure: thiazole-N(CH₃), C(OCH₃)–N=N–C(=N-aryl(CH₃))–phenyl with N-methyl-N-phenyl arylamine) | red |
| 14 | (structure: 1,3,3-trimethyl-2-methoxyindoline-2-CH=CH-C₆H₄-N(CH₃)-C₆H₄-OC₂H₅) | bluish-tinged red |
| 15 | (structure: 1,3,3-trimethyl-2-methoxyindoline-2-CH=CH-C₆H₄-N(CH₃)₂) | bluish-tinged red |
| 16 | (structure: bis(1,2-dimethylindol-3-yl)(phenyl)(methoxy)methane) | red |
| 17 | (structure: 1,3,3-trimethyl-2-methoxyindoline-2-CH=CH-(1-methyl-2-phenylindol-3-yl)) | orange |
| 18 | (structure: 1,3,3-trimethyl-2-methoxyindoline-2-CH=N-N(CH₃)-C₆H₄-OCH₃) | golden yellow |

-continued

| Example | Formula | Colour shade |
|---|---|---|
| 19 | (structure: tris(4-dimethylaminophenyl)methyl methyl ether) | violet |
| 20 | (structure: naphthalene with 1-(N-cyanoethyl-N-methyl) and 8-[C(OCH₃)(4-N,N-diethylaminophenyl)], 4-Cl) | blue |
| 21 | (structure: naphthalene with 1-(N-cyanoethyl-N-methyl) and 8-[C(OCH₃)(aryl-NH-CH₂CH₂-CH₂)] tetrahydroquinoline) | blue |
| 22 | (structure: naphthalene with 1-(N-ethyl-N-methyl) and 8-[C(OCH₃)(2,4-dimethoxyphenyl)]) | orange |
| 23 | (structure: dimethylamino cyclohexadiene linked via O to C(OCH₃)(2-methyl-4-methoxyphenyl)) | red |
| 24 | (structure: dimethylamino cyclohexadiene linked via O to C(OCH₃)(3,4-dimethoxyphenyl), with CH₃ vinyl) | red |
| 25 | (structure: 4-methoxy cyclohexadiene linked via O to C(OCH₃)(2-methyl-4-methoxyphenyl)) | orange |
| 26 | (structure: 4-methoxy cyclohexadiene-O-C(OCH₃)(CH=)-indoline with N-CH₃, gem-dimethyl) | orange |

-continued

| Example | Formula | Colour shade |
|---|---|---|
| 27 | | orange |
| 28 | | blue |

I claim:
1. Process for printing acid-modified textile fibre materials by the transfer printing process, which is characterised in that sublimable carbinol base derivatives of cationic dyestuffs of the formula

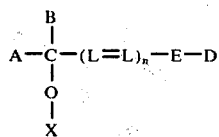

wherein
A, B and D represent an aryl or heteryl radical,
B additionally denotes hydrogen or conjointly with A can form the remaining members of a heterocyclic ring system,
X denotes alkyl, aralkyl, cycloalkyl or aryl,
E represents a direct bond or a > N-alkyl group,
L represents a methine group which is optionally substituted by alkyl, nitrile or alkoxycarbonyl, or represents an N atom and
$n$ denotes the numbers 0 or 1
are used as dyestuff intermediates.

2. Process according to claim 1, characterised in that the dyestuff intermediates used are those of the formulae a) 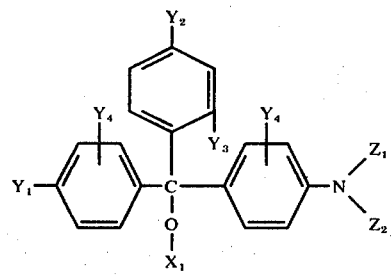

wherein
$Z_1$ and $Z_2$ denote H or $C_1$–$C_4$-alkyl,
$Y_1$ denotes amino, $C_1$–$C_4$-alkylamino, $C_2$–$C_4$-dialkylamino or $C_1$–$C_4$-alkoxy,
$Y_2$ denotes $Y_1$ or H,
$Y_3$ and $Y_4$ denote H, methyl or chlorine and
$X_1$ denotes $C_1$–$C_4$-alkyl, benzyl or phenyl, b) 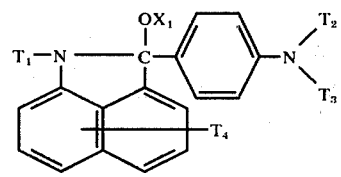

wherein
$T_1$ denotes methyl, ethyl, n-propyl, n-butyl, or cyanoethyl,
$T_2$ denotes methyl or ethyl,
$T_3$ denotes $T_2$ or H and
$T_4$ denotes H, Br or Cl and
$X_1$ has the indicated meaning, c) 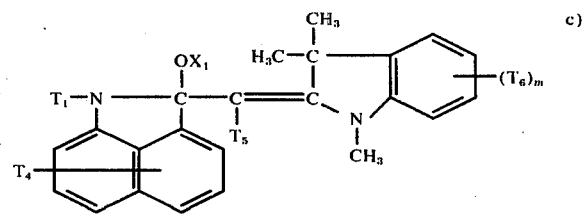

wherein
$T_1$, $T_4$ and $X_1$ have the indicated meaning and
$T_5$ denotes H or CN,
$T_6$ denotes H, $CH_3$, $OCH_3$, $NO_2$, Cl, $COOCH_3$ or $COOC_2H_5$ and
$m$ denotes 1 or 2,
or d) 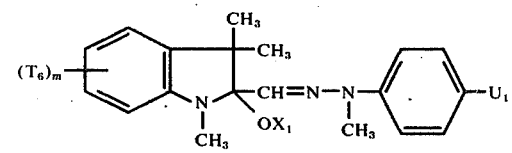

wherein
$X_1$, $T_6$ and $m$ have the meaning mentioned and
$U_1$ represents hydrogen, $C_1$–$C_4$-alkyl, $C_1$–$C_4$-alkoxy or $C_2$–$C_5$-alkylcarbonylamino.

3. Process according to claim 1 using the compound of the formula

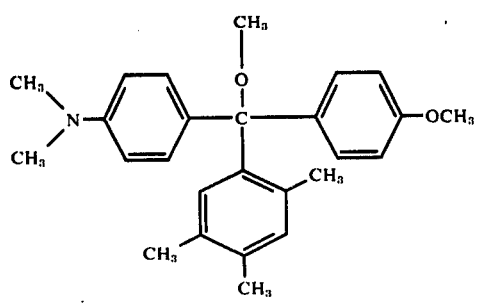
4. Process according to claim 1 using the compound of the formula
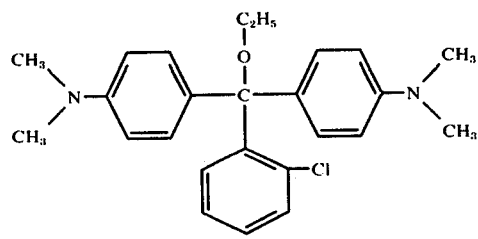
5. Process according to claim 1 using the compound of the formula
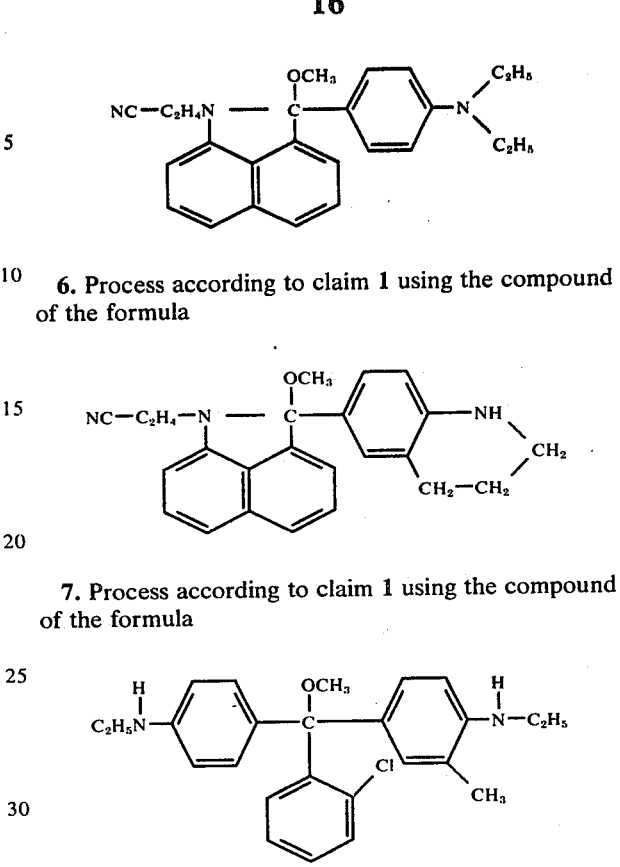
6. Process according to claim 1 using the compound of the formula
7. Process according to claim 1 using the compound of the formula
* * * * *